(12) United States Patent
Ottamalika et al.

(10) Patent No.: US 7,738,403 B2
(45) Date of Patent: Jun. 15, 2010

(54) METHOD FOR DETERMINING THE OPERATIONS PERFORMED ON PACKETS BY A NETWORK DEVICE

(75) Inventors: Iqlas Maheen Ottamalika, San Jose, CA (US); David C. White, Jr., Durham, NC (US); Madhusudan Challa, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1016 days.

(21) Appl. No.: 11/338,096

(22) Filed: Jan. 23, 2006

(65) Prior Publication Data
US 2007/0189178 A1 Aug. 16, 2007

(51) Int. Cl.
H04L 12/28 (2006.01)

(52) U.S. Cl. ........................ 370/255; 370/392
(58) Field of Classification Search ................ 370/252, 370/254, 255, 389, 392, 400, 401
See application file for complete search history.

(56) References Cited

U.S. PATENT DOCUMENTS

| | | | |
|---|---|---|---|
| 5,640,394 A | 6/1997 | Schrier et al. | |
| 5,696,899 A | 12/1997 | Kalwitz | |
| 5,850,388 A * | 12/1998 | Anderson et al. | 370/252 |
| 6,137,782 A * | 10/2000 | Sharon et al. | 370/255 |
| 6,515,967 B1 | 2/2003 | Wei et al. | |
| 6,539,022 B1 * | 3/2003 | Virgile | 370/401 |
| 2002/0071387 A1 | 6/2002 | Horiguchi et al. | |
| 2003/0091042 A1 * | 5/2003 | Lor | 370/389 |
| 2003/0187977 A1 | 10/2003 | Cranor et al. | |
| 2003/0236995 A1 * | 12/2003 | Fretwell, Jr. | 713/200 |
| 2004/0047349 A1 * | 3/2004 | Fujita et al. | 370/389 |
| 2004/0114590 A1 | 6/2004 | Harris | |
| 2005/0099948 A1 * | 5/2005 | Wakumoto et al. | 370/236 |
| 2005/0169186 A1 * | 8/2005 | Qiu et al. | 370/242 |
| 2005/0190758 A1 * | 9/2005 | Gai et al. | 370/389 |
| 2005/0259587 A1 * | 11/2005 | Wakumoto et al. | 370/248 |
| 2006/0023638 A1 * | 2/2006 | Monaco et al. | 370/252 |
| 2006/0077964 A1 * | 4/2006 | Wu et al. | 370/352 |
| 2007/0002769 A1 * | 1/2007 | Matityahu et al. | 370/255 |

OTHER PUBLICATIONS

USPTO; Office Action for U.S. Appl. No. 11/441,566; mailed Feb. 4, 2009.

* cited by examiner

*Primary Examiner*—Hong Cho
(74) *Attorney, Agent, or Firm*—Stolowitz Ford Cowger LLP (57) ABSTRACT

Methods and systems for determining the operations performed on packets by a network device are described. A simulated packet is input into a network device. The path taken by the simulated packet is traced. Also, the operations performed on the simulated packet are logged. Further, the operations performed on the simulated packet and configuration information of the operations are analyzed and displayed.

20 Claims, 7 Drawing Sheets

METHOD FOR DETERMINING THE OPERATIONS PERFORMED ON PACKETS BY A NETWORK DEVICE

TECHNICAL FIELD

Embodiments of the present invention pertain to a method for determining the operations performed on packets by a network device.

BACKGROUND

For a variety of reasons, a packet en route to its destination often passes through one or more networking device(s). For example, for security purposes, a packet may pass through a firewall, a router, or an Intrusion Prevention System (IPS). Once a networking device has received the packet it may perform a series of operations and actions on the packet before determining whether the packet should be allowed to be transmitted or dropped. For example, a firewall that has received a packet may perform a series of operations on the packet to determine whether the packet is valid and safe before transmitting it out the egress (output) interface.

With conventional approaches, the operations performed on the packet cannot be efficiently determined. For example, one traditional approach to analyzing the operations performed on the packet is by examining associated logs (syslogs) and debugs. The limitation of current logs and debugs is that they do not apply to a single packet, but instead to an entire feature or protocol. Because of this, trying to determine the operations performed on a packet by examining associated logs and/or debugs requires correlation of the logs/debugs back to the specific packet. This is very time consuming and inefficient.

This inefficiency causes problems for different network related operations. In one example, this inefficiency causes problems for the security operations group. The security operations group is responsible for ensuring a network device meets a set of network security guidelines. In order to accomplish this, security operations analyze both network traffic that is destined for the network device and network traffic that passes through the network device.

With conventional approaches, the network device's configuration is analyzed to determine the security posture. Logs (syslog) are then scrutinized to validate that the network device is denying traffic that is denied in the configuration, and permitting traffic that is permitted in the configuration. However, this approach is inefficient and painstakingly slow.

In another example, the network operations group is negatively affected by the lack of an efficient way to determine the operations performed on a packet as well. Network operations group verifies network connectivity between network users and resources, e.g., servers. In essence, the network operations group analyzes connectivity issues and determines why a user is unable to access a resource. With conventional approaches, a member of the network operations group frequently has to spend a significant amount of time to determine the operations performed on packets in order to troubleshoot the connectivity issue.

Specifically, a member of the network operations group may first analyze all the operations taken on the packet. Subsequently, an attempt is made to determine which operation is causing the connectivity to fail. If a cause is determined, the network operations agent may need to match the operation with an associated entry in the configuration to enable, disable, or modify the behavior. However, if the configuration is large, this approach becomes difficult, time-consuming, and without detailed knowledge of the network device one cannot effectively perform the troubleshooting.

DETAILED DESCRIPTION OF THE DRAWINGS

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which can be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention can be practiced without these specific details. In other instances, well known methods, procedures, components, and circuits have not been described in detail as not to unnecessarily obscure aspects of the invention.

Under traditional approaches, it is often difficult to determine the operations taken on a packet. For example, scrutinizing logs (syslog) to validate if a network device is denying traffic that is denied in its corresponding configuration and permitting traffic that is permitted in the corresponding configuration is often time consuming and inefficient. Thus, an efficient way to determine the operations taken on a packet is desired.

In contrast to traditional approaches, the present invention sets forth a method to efficiently determine the operations performed on a packet by a network device. Embodiments utilize a simulated packet to determine actions and operations performed on a packet by a network device. In one embodiment, a simulated packet is input into a network device and the path taken by the simulated packet is recorded by adding tags to the simulated packet. Similarly, the operations performed on the simulated packet are recorded by adding additional tags indicating the operations performed. Further, if the simulated packet is dropped internally by an operation or has reached an egress interface and is ready to be transmitted, the tags are removed from the simulated packet and ordered for analysis. Upon removal, the tags are analyzed and the actions taken on the simulated packet are determined. Hence, embodiments advantageously allow operations taken on a packet to be determined effectively.

Figure 1:
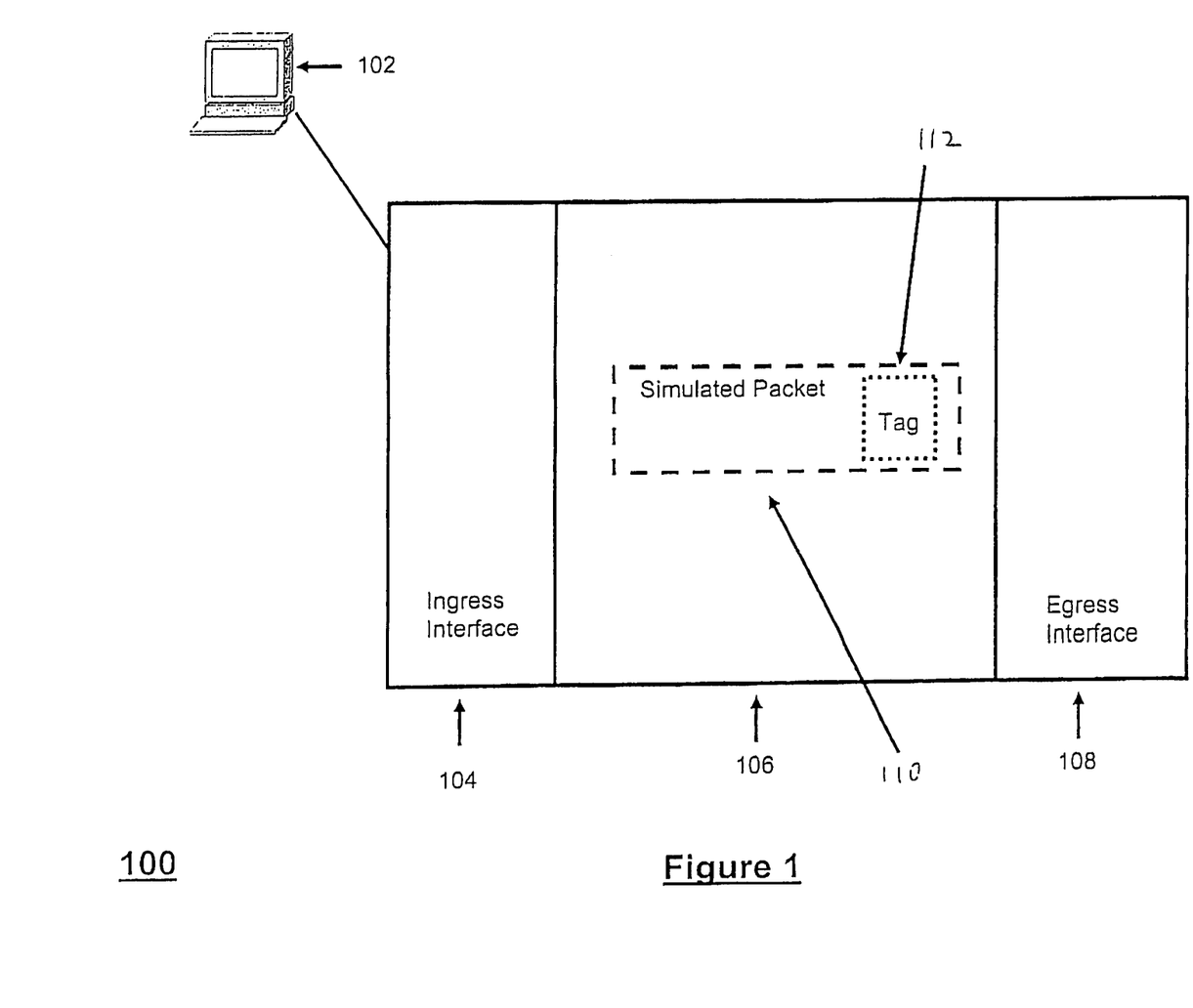
FIG. 1 illustrates a system for determining the operations performed on packets by a network device, in accordance with an embodiment of the present invention.

FIG. 1 illustrates a system 100 for determining the operations performed on packets by a network device, in accordance with an embodiment of the present invention. System 100 includes command line interface station 102 for defining key attributes of a simulated packet, ingress interface 104, network device 106, egress interface 108, simulated packet 110, and tag 112 to indicate operations performed on the simulated packet 110.

Also, although system 100 is shown and described as having certain numbers and types of elements, the present invention is not so limited; that is, system 100 can include elements other than those shown, and can include more than one of the elements that are shown. For example, system 100 can include a greater or fewer number of tags than the one tag (tag 112) shown.

In one embodiment, a user creates a simulated packet 110 using command line interface station 102 by defining key attributes of simulated packet 110. Specifically, key attribute information may include ingress interface information, source Internet Protocol address, destination Internet Protocol address, protocol used, source port information, destination port information, and/or a hex dump of a packet.

Upon creation of a simulated packet 110, the simulated packet 110 is input into network device 106 via ingress interface 104 of network device 106. Network device 106 can be a firewall, a router, an Intrusion Prevention System (IPS), other types of network security devices, and/or other compatible devices.

Simulated packet 110 travels through the same processing paths of network device 106 as if it were a non-simulated packet. However, in contrast to non-simulated packets, if an operation is performed on the simulated packet 110, a tag, such as tag 112, is added to the simulated packet 110 to indicate the operation. Similarly, the path taken by simulated packet 110 is indicated by additional tags.

Upon reaching either an egress interface, e.g., egress interface 108, of the network device 106 or being dropped internally by an operation, simulated packet 110 is removed from its path. The tags, such as tag 112, are removed, ordered for processing, and analyzed to determine the actions and operations taken on simulated packet 110.

Figure 2A:
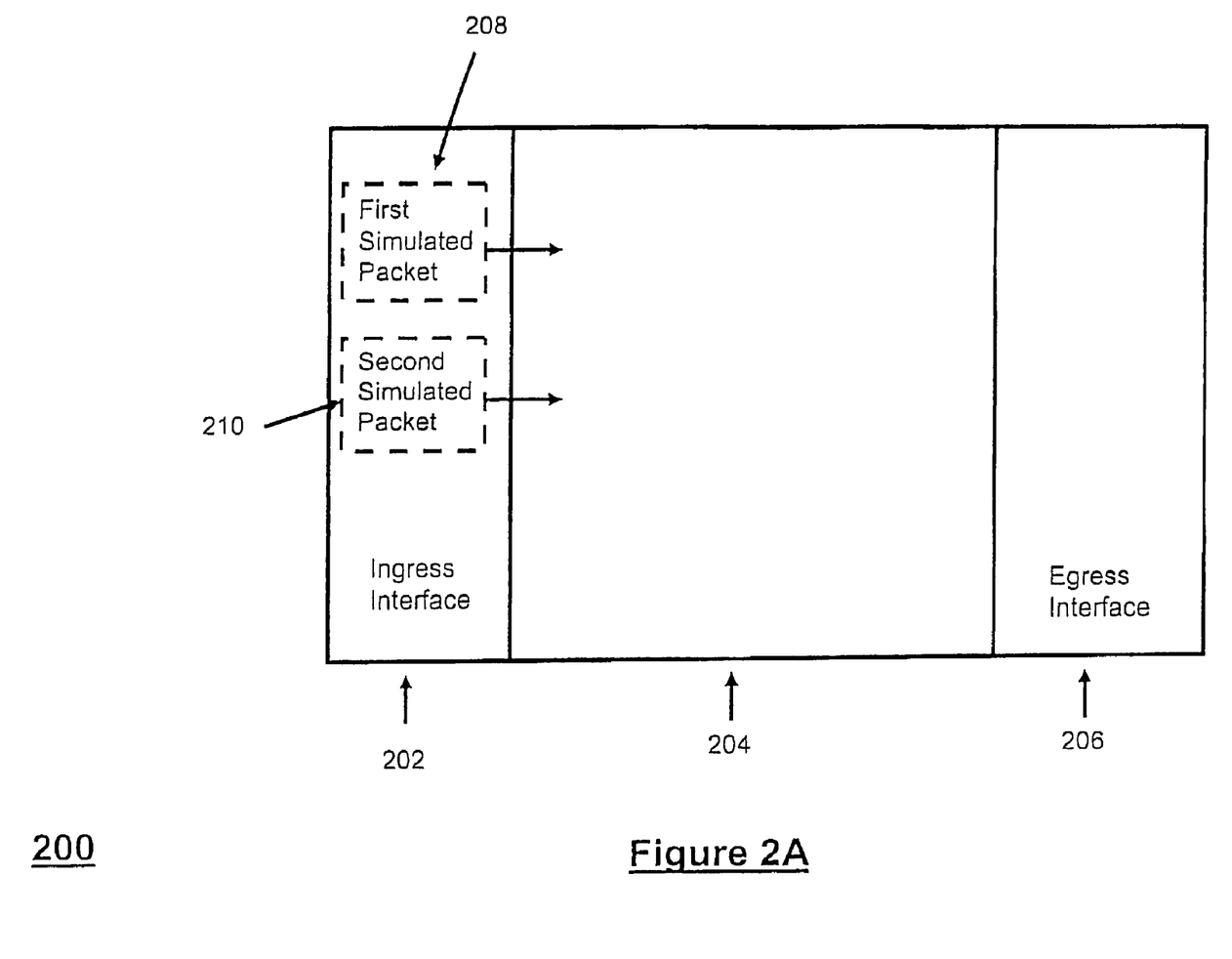
FIGS. 2A, 2B, and 2C illustrate block diagrams of a system for determining the actions performed on packets by a network device in operation, in accordance with an embodiment of the present invention.
Figure 2B:
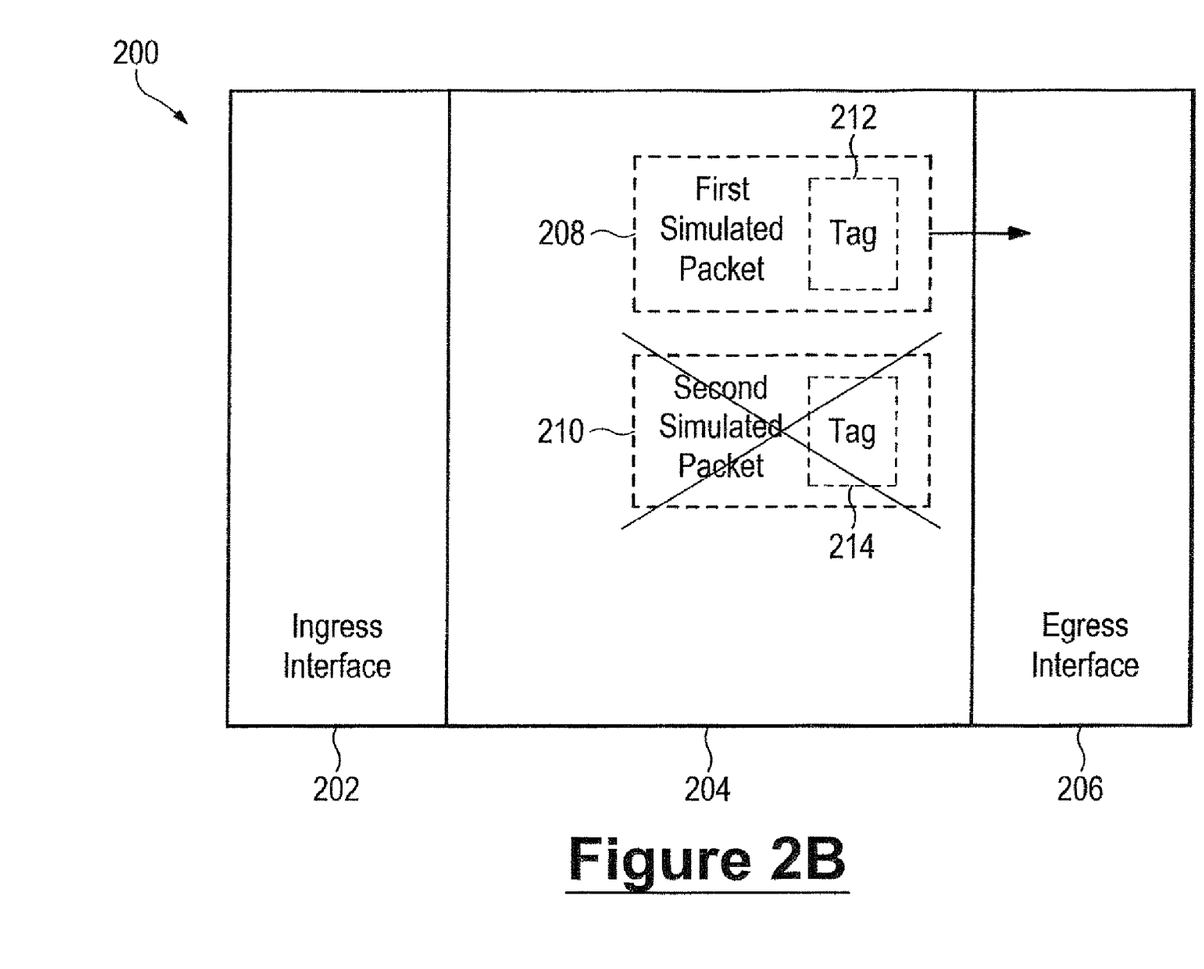
Figure 2C:
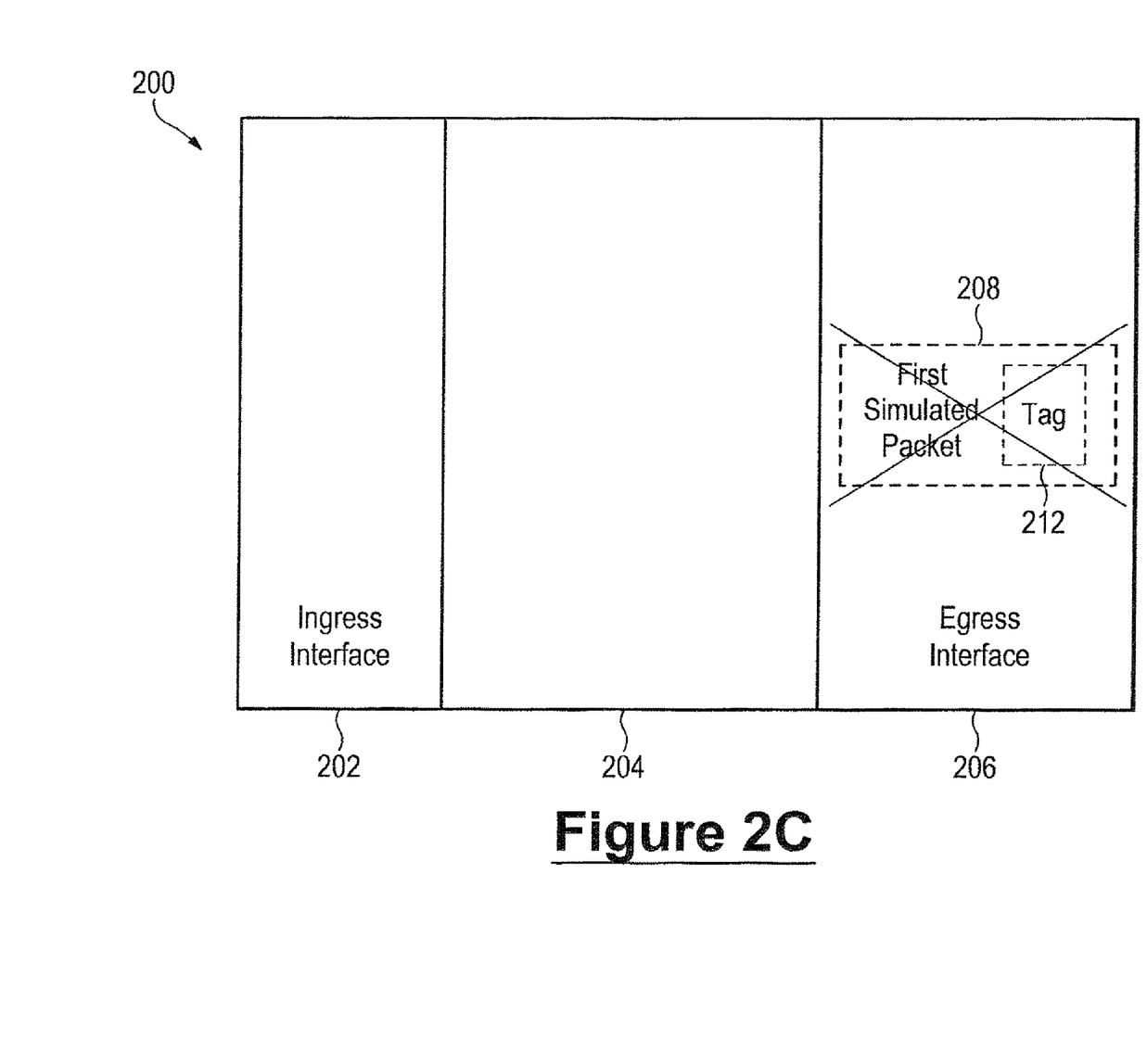

FIGS. 2A, 2B, and 2C illustrate block diagrams of a system 200 for determining the actions performed on packets by a network device in operation, in accordance with an embodiment of the present invention. System 200 includes a first simulated packet 208, a second simulated packet 210, an ingress interface 202, a network device 204, and an egress interface 206.

Also, although system 200 is shown and described as having certain numbers and types of elements, the present invention is not so limited; that is, system 200 can include elements other than those shown, and can include more than one of the elements that are shown. For example, system 200 can include a greater or fewer number of simulated packets than the two simulated packets (first simulated packet 208 and second simulated packet 210) shown.

With reference now to FIG. 2A, first simulated packet 208 and second simulated packet 210 is input into ingress interface 202. In one embodiment, first simulated packet 208 and/or second simulated packet 210 is generated from the hex dump of a non-simulated packet. In other embodiments, first simulated packet 208 and/or second simulated packet 210 is generated by a user defining key attributes of the simulated packet at a command line interface.

Referring now to FIG. 2B, a first operation is performed on first simulated packet 208 and tag 212 is added to first simulated packet 208 to indicate the first operation. Also, a first operation is performed on second simulated packet 210 and tag 214 is added to second simulated packet 210 to indicate the first operation. However, the second simulated packet 210 is dropped internally and removed from its path. At this point, tag 214 is removed from simulated packet 210 and analyzed to determine the operations, e.g., first operation, performed on simulated packet 210.

An operation, such as the first operation, performed on the first simulated packet 208 and/or second simulated packet 210 can be an ingress access filter operation, a route lookup operation, a network address translation (NAT) operation, an authentication and/or authorization operation, an advanced protocol filter operation, a quality of service operation, an encryption and/or decryption operation, a tunneling operation, an egress access filter, an egress interface, and/or a final action to transmit or drop operation.

In FIG. 2C, first simulated packet 208 reaches egress interface 206 and is consequently removed from its path. Tag 212 is removed from first simulated packet 210 and analyzed to determine the operations, e.g., first operation, taken on first simulated packet 210.

Figure 3:
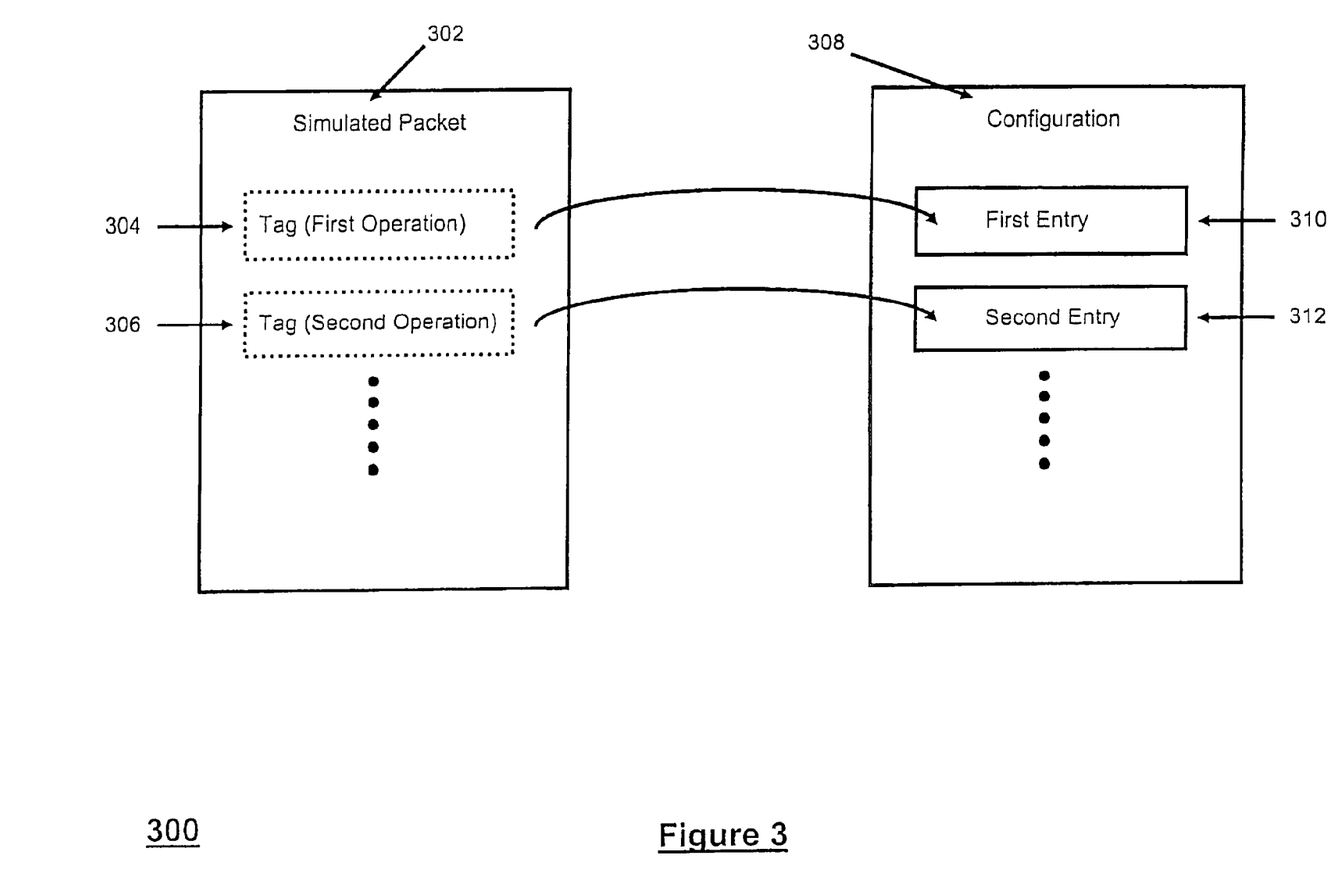
FIG. 3 illustrates a block diagram of a simulated packet being analyzed, in accordance with an embodiment of the present invention.

FIG. 3 illustrates a block diagram of a simulated packet being analyzed, in accordance with an embodiment of the present invention. The simulated packet 302 includes tag 304 and tag 306. Also, configuration information 308 includes first entry 310 and second entry 312.

Also, although simulated packet 302 and configuration information 308 are shown and described as having certain numbers and types of elements, the present invention is not so limited; that is, simulated packet 302 and configuration information 308 can include elements other than those shown, and can include more than one of the elements that are shown. In one example, simulated packet 302 can include a greater or fewer number of tags than the two tags (tags 304 and 306) shown. In another example, configuration information 308 can include a greater or fewer number of entries than the two entries (first entry 310 and second entry 312) shown.

Once a simulated packet, e.g., simulated packet 302, is removed from its path, the associated tags, such as tags 304 and 306, are removed in order, and analyzed to determine the operations performed on the simulated packet.

In the present embodiment, tag 304 and tag 306 indicate the operations performed on simulated packet 302 and are removed. Upon removal, the operations indicated by tags 304 and 306 are correlated with its corresponding entries, e.g., first entry 310 and second entry 312, in the configuration information.

Specifically, the operation indicated in tag 304 is correlated to first entry 310 of configuration information 308 and the operation indicated in tag 306 is correlated to second entry 312 of configuration information 308. Once the process of correlation is complete, the results may be displayed to a user. Although in the present embodiment a tag only corresponds to one operation, the present invention is not so limited. In other embodiments, a tag may indicate several separate operations performed on a simulated packet.

By automatically correlating an operation to its associated entry in the configuration information, a user can easily match an action taken on a simulated packet to the corresponding configuration. Thus, the present invention allows a more time effective way for debugging, troubleshooting, or verification of configuration rules.

Figure 4:
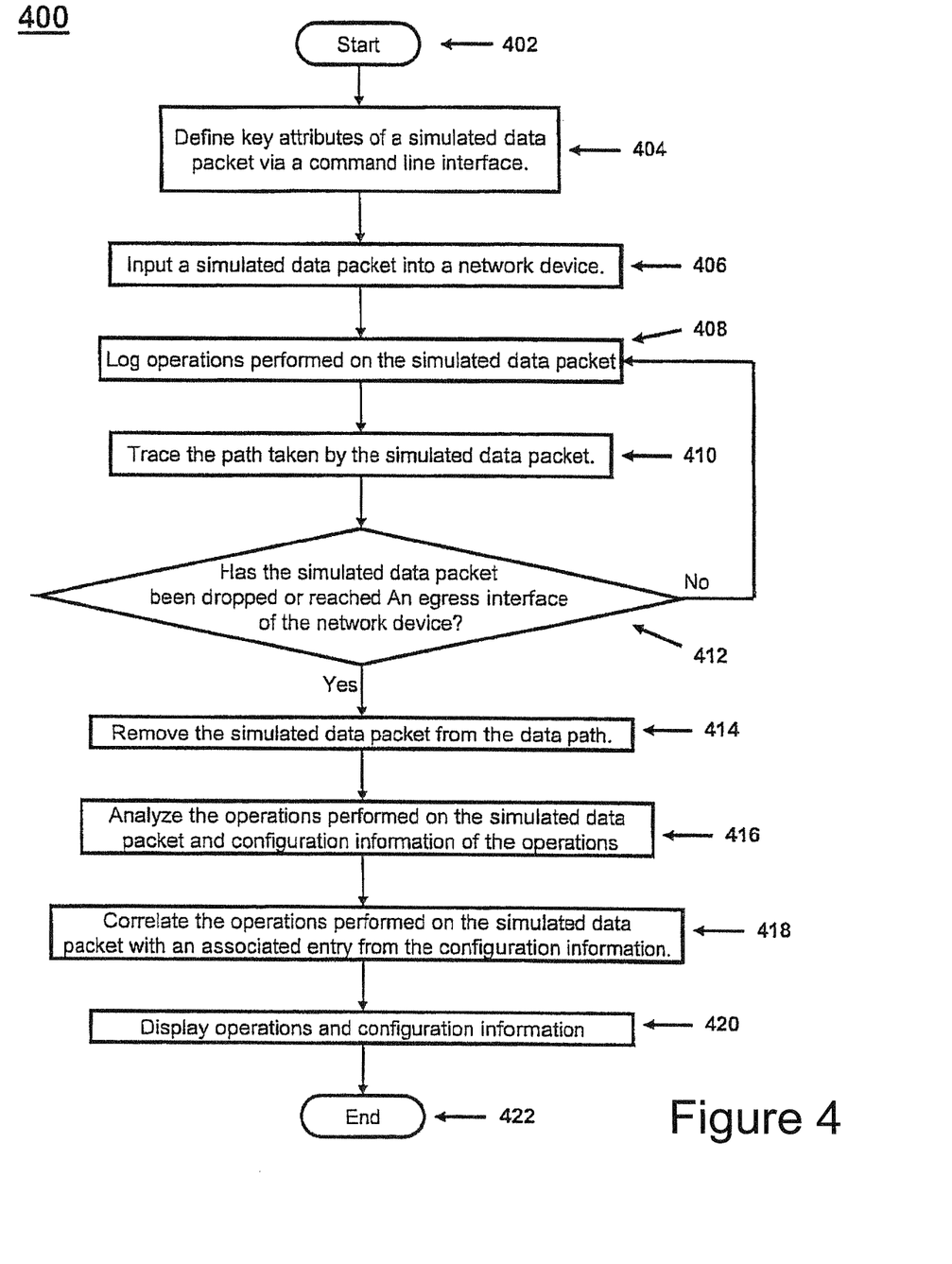
FIG. 4 illustrates a flowchart of a method for determining the operations performed on packets by a network device upon which embodiments in accordance with the present invention can be implemented.

FIG. 4 illustrates a flowchart 400 of a method for determining the operations performed on packets by a network device upon which embodiments in accordance with the present invention can be implemented. Although specific steps are disclosed in flowchart 400, such steps are exemplary.

That is, embodiments of the present invention are well suited to performing various other or additional steps or variations of the steps recited in flowchart 400. It is appreciated that the steps in flowchart 400 can be performed in an order different than presented.

At block 402, the process starts.

At block 404, key attributes of a simulated packet are defined using a command line interface. Key attributes may include ingress interface information, source Internet Protocol address, destination Internet Protocol address, protocol used, source port information, destination port information, and/or a hex dump of a non-simulated packet.

At block 406, a simulated packet is input into a network device. In one embodiment, the simulated packet is injected into the ingress interface of the network device. Also, a network device can be a firewall, a router, an Intrusion Prevention System (IPS), a network security device, and/or other compatible network devices.

At block 408, operations performed on simulated packet are logged. In one embodiment, an operation performed on the simulated packet is logged by adding a tag indicating the operation onto the simulated packet.

At block 410, the path taken by the simulated packet is traced. In one embodiment, the path taken by the simulated packet is traced by adding tags indicating the path taken by the simulated packet.

At block 412, it is determined whether the simulated packet has been dropped or has reached an egress interface of the network device. Determining whether the simulated packet has been dropped or has reached an egress interface of the network device can be implemented in a variety of ways. In one embodiment, a processor determines whether the simulated packet has been dropped or has reached an egress interface of the network device. If it is determined that the simulated packet has not been dropped or has not reached an egress interface of the network device, then operations performed on the simulated packet continues to be logged.

At block 414, if the simulated packet has been dropped internally or has reached an egress interface of the network device, then the simulated packet is removed from the data path. In one embodiment, removal is implemented by deleting the simulated packet. In another embodiment, removal is implemented by directing the simulated packet away from its prior path. Also, removal can be immediate or time-delayed.

At block 416, operations performed on the simulated packet and configuration information of the operations are analyzed. In one embodiment, the tags from the simulated packet are removed in order, and analyzed to determine the actions taken on the simulated packet.

At block 418, the operations performed on the simulated packet are correlated with associated entries from the configuration information. In one embodiment, each tag is automatically correlated with its associated entry from the configuration information.

At block 420, operations and configuration information are displayed. In one example, the operations performed on the simulated packet and its associated configuration information are displayed to a user via a monitor.

At block 422, the process ends.

Thus, embodiments provide an effective way to match an action taken on a simulated packet with its associated configuration information. In one example, embodiments set forth a pro-active tool that allows network operators to verify configuration information. In another example, embodiments enable security operators to efficiently verify that a network device is denying traffic that is denied in the configuration, and permitting traffic that is permitted in the configuration.

Figure 5:
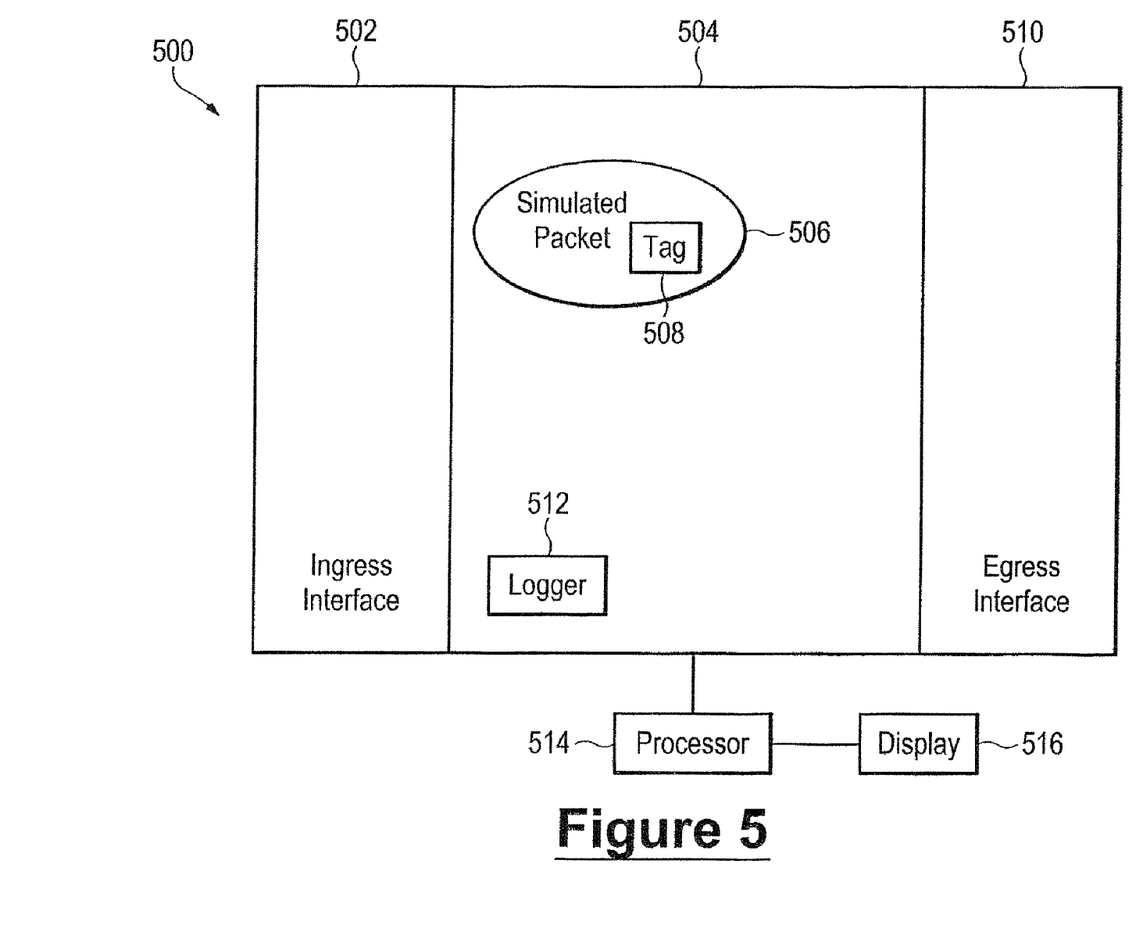
FIG. 5 illustrates block diagrams of a system for determining the actions taken on packets by a network device, in accordance with an embodiment of the present invention.

FIG. 5 illustrates block diagrams of a system 500 for determining the actions taken on packets by a network device, in accordance with an embodiment of the present invention. System 500 includes a network device 504, an ingress interface 502 of the network device 504, an egress interface 510 of the network device 504, a simulated packet 506, a tag 508 for indicating actions taken on the simulated packet, a logger 512 for logging actions taken on the simulated packet, a processor 514 for processing actions taken on said simulated packet and configuration information of the actions, and a display 516 for displaying actions and configuration information. Also, network device 504 is coupled with processor 514, which in turn is coupled with display 516.

Also, although system 500 is shown and described as having certain numbers and types of elements, the present invention is not so limited; that is, system 500 can include elements other than those shown, and can include more than one of the elements that are shown. For example, system 500 can include a greater or fewer number of tags than the one tag (tag 508) shown.

In one embodiment, a user creates a simulated packet 506 and inputs it into ingress interface 502. A simulated packet can be created in many ways. In one instance, a simulated packet can be created at a command line interface station by defining key attributes, such as ingress interface information, source Internet Protocol address, destination Internet Protocol address, and/or hex dump of a packet, of simulated packet 506.

Upon creation of simulated packet 506, the simulated packet 506 is input into network device 504 via ingress interface 502. Network device 504 can be a router, a firewall, an Intrusion Prevention System (IPS), other types of network security devices, and/or other compatible devices. As simulated packet 506 travels through network device 504, logger 512 logs actions taken on simulated packet 506 and records the path taken by the simulated packet 506.

In one embodiment, logging is performed by a centralized entity, for example, logger 512 that logs all the actions taken on the simulated packet. In one example, logger 512 logs actions taken on a simulated packet by adding one or more tags to the simulated packet. Also, a tag can indicate one or more actions taken on the simulated packet. In another example, there is a greater number of loggers than the one (logger 512) shown in FIG. 5 and each process that performs an action on the simulated packet acts as a logger and logs the action performed on the simulated packet accordingly.

Upon reaching either an egress interface, e.g., egress interface 510, of the network device 504 or being dropped internally by an action, simulated packet 506 is removed from its path. The tags, such as tag 508, are removed, ordered for processing by processor 514 and analyzed to determine the actions taken on simulated packet 506. In one embodiment, the processor automatically correlates an action of said actions taken on the simulated packet with an associated entry from the configuration information. Further, the actions and configuration information is displayed to a user via display 516.

In the foregoing specification, embodiments of the invention have been described with reference to numerous specific details that can vary from implementation to implementation. Thus, the sole and exclusive indicator of what is, and is intended by the applicants to be the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method for determining operations performed on packets by a network device, the method comprising:
   generating a simulated packet comprising user defined attribute information including one or more of the following: ingress interface data, source Internet Protocol (IP) address, destination IP address, communication protocol, source port data, destination port data or hex dump data;
   inputting the simulated packet into the network device;
   tracing a path taken by the simulated packet through the network device;
   logging operations performed on the simulated packet during processing by the network device;
   analyzing operations performed on the simulated packet and configuration information of the operations to verify that the network device is permitting or denying other packets according to the configuration information; and
   displaying operations and configuration information.

2. The method of claim 1 further comprises correlating an operation of the operations performed on the simulated packet with an associated entry from the configuration information.

3. The method of claim 1, wherein the simulated packet is generated from a hex dump of a packet.

4. The method of claim 1, wherein the simulated packet is removed from the path if the simulated packet is dropped.

5. The method of claim 1, wherein the simulated packet is removed from the path if the simulated packet reaches an egress interface of the network device.

6. The method of claim 1, wherein key attributes of the simulated packet is defined by a user via a command line interface (CLI).

7. The method of claim 1, wherein the network device is a firewall.

8. The method of claim 1, wherein the network device is a router.

9. The method of claim 1, wherein the network device is an Intrusion Prevention Device.

10. The method of claim 1, wherein the logging comprises adding a tag to the simulated packet to indicate the operations performed on the simulated packet.

11. A system for determining operations performed on packets by a network device, the system comprising:
    means for generating a simulated packet from a hex dump of a non-simulated packet;
    means for inputting the simulated packet into the network device;
    means for tracing a path taken by the simulated packet through the network device;
    means for logging operations performed on the simulated packet during processing by the network device;
    means for analyzing operations performed on the simulated packet and configuration information of the operations to verify that the network device is permitting or denying other packets according to the configuration information; and
    means for displaying operations and configuration information.

12. The system of claim 11, wherein the means for logging comprises means for adding tags to the simulated packet.

13. The system of claim 12, wherein the tags indicate a plurality of actions taken on the simulated packet.

14. An apparatus for determining actions taken on packets by a network device, comprising:
    an ingress interface for receiving a simulated packet into the network device wherein the simulated packet is generated from user defined attribute information;
    a logger for logging actions taken on the simulated packet during processing by the network device and for recording a path taken by the simulated packet as the simulated packet travels through the network device;
    a processor for processing actions taken on the simulated packet and configuration information of the actions to verify that the network device is permitting or denying other packets according to the configuration information; and
    a display for displaying actions and configuration information.

15. The apparatus of claim 14, wherein the network device is a router.

16. The apparatus of claim 14, wherein the processor automatically correlates an action of the actions taken on the simulated packet with an associated entry from the configuration information.

17. The apparatus of claim 14, wherein the simulated packet is removed from the path if the simulated packet is dropped.

18. The apparatus of claim 14, wherein the simulated packet is removed from the path if the simulated packet reaches an egress interface of the network device.

19. The apparatus of claim 14, wherein the user defined attribute information of the simulated packet is defined by a user via a command line interface (CLI).

20. The apparatus of claim 19, wherein the user defined attribute information comprises ingress interface information, source Internet Protocol address, and destination Internet Protocol address.

* * * * *